United States Patent
Collins et al.

(10) Patent No.: US 7,152,933 B2
(45) Date of Patent: Dec. 26, 2006

(54) BRAKE BOOSTER VACUUM PREDICTION ALGORITHM AND METHOD OF USE THEREFOR

(75) Inventors: James F. Collins, Farmington Hills, MI (US); Robert L. Nisonger, Milford, MI (US); Christopher P. Murphy, Linden, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/266,604

(22) Filed: Nov. 3, 2005

(65) Prior Publication Data

US 2006/0049690 A1     Mar. 9, 2006

Related U.S. Application Data

(62) Division of application No. 10/815,383, filed on Apr. 1, 2004.

(51) Int. Cl.
*B60T 8/44*      (2006.01)

(52) U.S. Cl. .................. 303/114.3; 303/115.3

(58) Field of Classification Search ............. 303/114.3, 303/115.2, 115.3, 191, 113.3; 701/29, 70, 701/78, 79, 110
See application file for complete search history.

(56) References Cited

U.S. PATENT DOCUMENTS

| | | | | |
|---|---|---|---|---|
| 6,033,038 A | * | 3/2000 | Kulkarni et al. | 303/114.3 |
| 6,305,757 B1 | * | 10/2001 | Ohsaki et al. | 303/114.3 |
| 6,393,345 B1 | * | 5/2002 | Kerns et al. | 701/34 |
| 2002/0130550 A1 | * | 9/2002 | Roden et al. | 303/113.1 |

* cited by examiner

*Primary Examiner*—James McClellan
*Assistant Examiner*—Bradley T. King
(74) *Attorney, Agent, or Firm*—Laura C. Hargitt (57) ABSTRACT

An algorithm residing in, for example the ECM of a motor vehicle, which predicts brake booster vacuum for vehicles using vacuum for brake pedal assist. The predicted brake booster vacuum is compared to a calibrated brake booster vacuum threshold to determine if adequate brake booster vacuum is available to meet vehicle braking requirements, whereupon engine operation can be modified, as necessary, to improve intake manifold vacuum such that brake booster vacuum requirements for vehicle braking are better satisfied.

2 Claims, 10 Drawing Sheets

BRAKE BOOSTER VACUUM PREDICTION ALGORITHM AND METHOD OF USE THEREFOR

RELATED APPLICATION

This application is a division of U.S. Ser. No. 10/815,383 filed on Apr. 1, 2004.

TECHNICAL FIELD

The present invention relates to motor vehicles and, more particularly, to motor vehicles with brake boosters using vacuum for brake pedal assist.

BACKGROUND OF THE INVENTION

Most engines on motor vehicles with brake boosters using vacuum (brake booster vacuum) for brake pedal assist utilize the engine intake manifold as a vacuum source for the brake booster to provide sufficient brake booster vacuum to meet vehicle braking requirements.

Some engines now use Displacement on Demand, which deactivates cylinders when load requirements are low, and/or use variable valve timing and/or other engine controls that can affect brake booster vacuum. These technologies improve fuel economy by reducing intake manifold vacuum (that is, the absolute pressure of the intake manifold increases) in order to reduce pumping losses. When the reduced intake manifold vacuum is such that the brake booster vacuum exceeds a calibrated brake booster vacuum threshold (that is the absolute pressure of the brake booster vacuum is higher than the absolute pressure of the brake booster vacuum threshold), it could theoretically result in inadequate brake booster vacuum to meet vehicle braking requirements and engine operation must be modified to provide adequate intake manifold vacuum to meet brake booster vacuum requirements for vehicle braking. For example, on engines with Displacement on Demand, the engine operation is modified to disable cylinder deactivation to increase manifold vacuum, whereas on engines with variable valve timing, engine operation could be modified to increase intake valve opening to increase manifold vacuum.

Presently, a vacuum sensor could be used in the brake booster to determine if the brake booster vacuum exceeds a calibrated brake booster vacuum threshold, whereupon engine operation would be modified to increase manifold vacuum to meet brake booster vacuum requirements for vehicle braking, but at an added cost per vehicle. Another alternative could be a supplemental vacuum pump to assist manifold vacuum to meet brake booster vacuum requirements for vehicle braking, but at an even higher cost per vehicle.

Accordingly, what is needed in the art is a less costly alternative to provide adequate intake manifold vacuum to meet brake booster vacuum requirements for vehicle braking by modifying engine operation when the intake manifold vacuum is such that the brake booster vacuum exceeds a calibrated brake booster vacuum threshold.

SUMMARY OF THE INVENTION

The present invention is an algorithm residing, preferably, within the main engine controller or engine control module (ECM) of a motor vehicle, which predicts or estimates brake booster vacuum for vehicles using vacuum for brake pedal assist. The predicted or estimated brake booster vacuum is compared to a calibrated brake booster vacuum threshold to determine if adequate brake booster vacuum is available to meet vehicle braking requirements, whereby engine operation can be modified, as necessary, to improve intake manifold vacuum such that brake booster vacuum requirements for vehicle braking are better satisfied.

In a first preferred embodiment of the present invention, vehicle input parameters are, at least, manifold absolute pressure (MAP), atmospheric pressure, and vehicle speed, all of which being available from the main engine controller or engine control module (ECM). Vehicle speed is used to determine vehicle deceleration by which the occurrence of a brake event can be determined. Changes in brake booster vacuum are modeled based on the level and duration of the vehicle deceleration and the intake manifold vacuum using look-up tables containing vehicle specific parameters by which brake booster vacuum is then predicted or estimated. The predicted or estimated brake booster vacuum is then compared to a calibrated brake booster vacuum threshold to determine if adequate brake booster vacuum is available to meet vehicle braking requirements. If not, engine operation is modified to improve intake manifold vacuum such that brake booster vacuum requirements for vehicle braking are better satisfied.

In a second preferred embodiment of the present invention, vehicle input parameters are, at least, manifold absolute pressure (MAP), atmospheric pressure, and vehicle speed, all of which being available from the main engine controller or engine control module (ECM). Vehicle speed is used to determine vehicle deceleration by which the occurrence of a brake event can be determined. Brake booster vacuum is repeatedly predicted or estimated through repeated calculations utilizing known and calculated vehicle parameters and variables, instead of look-up tables containing vehicle specific parameters as in the first preferred embodiment of the present invention. The calculated prediction or estimation of brake booster vacuum is compared to a calibrated brake booster vacuum threshold to determine if adequate brake booster vacuum is available to meet vehicle braking requirements. If not, engine operation is modified to improve intake manifold vacuum such that brake booster vacuum requirements for vehicle braking are better satisfied.

In a third preferred embodiment of the present invention, vehicle input parameters are, at least, manifold absolute pressure (MAP), atmospheric pressure, and brake pedal position, all of which being available from the main engine controller or engine control module (ECM). Brake pedal position may, for example, be obtained from a variable resistor or potentiometer attached to the brake pedal, whereby the output resistance is functionally related, for example empirically, to brake pedal position. Brake booster diaphragm position, or equivalently, brake master cylinder displacement as a function of brake pedal position is then, preferably, empirically determined and stored in ECM memory thereby providing a functional relationship between brake pedal position and brake booster diaphragm displacement or brake master cylinder displacement. Brake pedal position is used to determine the occurrence of a brake event. Brake booster vacuum is repeatedly predicted or estimated through repeated calculations utilizing known and calculated vehicle parameters and variables, instead of the look-up tables containing vehicle specific parameters as in the first preferred embodiment of the present invention. The calculated prediction or estimation of brake booster vacuum is compared to a calibrated brake booster vacuum threshold to determine if adequate brake booster vacuum is available to meet vehicle braking requirements. If not, engine operation is modified to improve intake manifold vacuum such that brake booster vacuum requirements for vehicle braking are better satisfied.

In a fourth preferred embodiment of the present invention, vehicle input parameters are, at least, manifold absolute pressure (MAP), atmospheric pressure, and brake pedal position, all of which being available from the main engine controller or engine control module (ECM). Brake pedal position may, for example, be obtained as described with respect to the third preferred embodiment. Brake booster diaphragm position, or equivalently, brake master cylinder displacement as a function of brake pedal position is then, preferably, empirically determined and stored in ECM memory, thereby providing a functional relationship between brake pedal position and brake booster diaphragm displacement or brake master cylinder displacement. Brake pedal position is used to determine the occurrence of a brake event. Changes in brake booster vacuum are modeled based on the brake pedal position and the intake manifold vacuum using look-up tables containing vehicle specific parameters by which brake booster vacuum is then predicted or estimated. The predicted or estimated brake booster vacuum is compared to a calibrated brake booster vacuum threshold to determine if adequate brake booster vacuum is available to meet vehicle braking requirements. If not, engine operation is modified to improve intake manifold vacuum such that brake booster vacuum requirements for vehicle braking are better satisfied.

Many variations in the embodiments of present invention are contemplated, as described herein in more detail. Other applications of the present invention will become apparent to those skilled in the art when the following description of the best mode contemplated for practicing the invention is read in conjunction with the accompanying drawings.

DESCRIPTION OF THE PREFERRED EMBODIMENT

Figure 1:
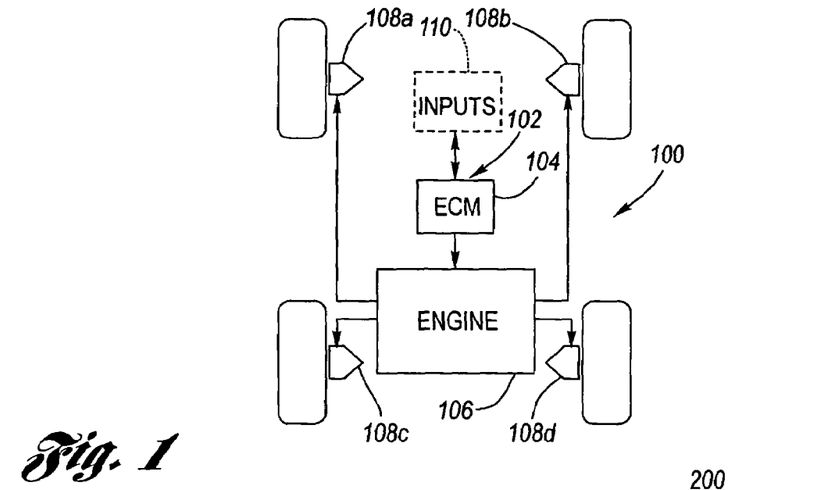
FIG. 1 is a schematic representation of a motor vehicle brake system.

Referring now to the Drawings, FIG. 1 is a schematic representation of a motor vehicle brake system 100. The brake booster vacuum prediction algorithm according to the present invention 102 resides, preferably, within the engine control module (ECM) 104. The ECM 104 controls the operation of the vehicle engine 106 and, through intake manifold vacuum 106V, the brake booster vacuum of the brake booster 112 providing brake pedal 116 assist to the master cylinder for actuation of the brakes 108a, 108b, 108c, 108d of the vehicle. External vehicle inputs 110 may be provided to the ECM 104 for purposes of operation of the present invention.

Figure 2:
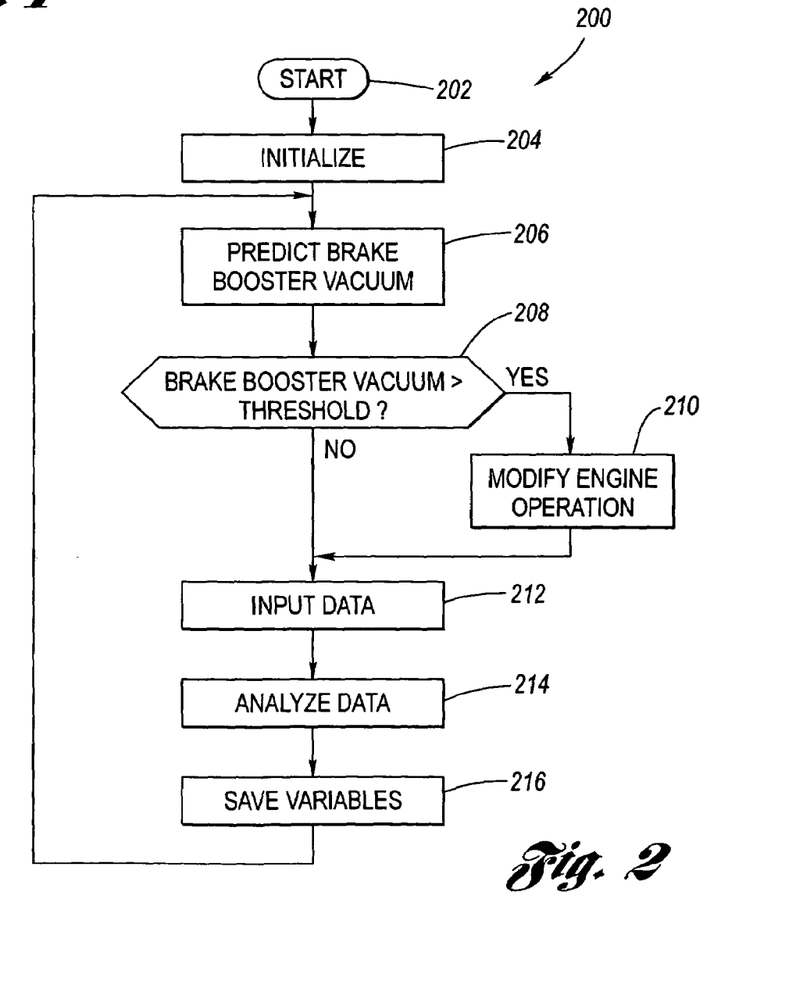
FIG. 2 is an overview flow chart of the brake booster vacuum prediction algorithm according to the present invention.

FIG. 2 is an overview flow chart algorithm 200 of the brake booster vacuum prediction algorithm according to the present invention. The algorithm 200 starts at Block 202 through the main engine controller or ECM then control passes to Block 204 where initialization of variables and parameters occurs. Brake booster vacuum is then predicted at Block 206 and compared at Block 208 to a predetermined calibrated brake booster vacuum threshold, available from the ECM. If brake booster vacuum is greater than the brake booster vacuum threshold (that is the absolute pressure of the brake booster vacuum is higher than the absolute pressure of the brake booster vacuum threshold), denoting inadequate brake booster vacuum to meet vehicle braking requirements, then engine operation is modified at block 210 by the ECM to improve intake manifold vacuum to better meet brake booster vacuum requirements for vehicle braking, after which control passes to Block 212. Otherwise, control passes to Block 212 without modifying engine operation. Data for analyses is input, for example from the ECM, at Block 212 and is analyzed at Block 214 and saved in, preferably, ECM memory at Block 216, after which control passes back to Block 206, thereby enabling the algorithm to repeat. The main program of the ECM executes Block 210 and, preferably, Block 208.

Variables and parameters utilized in FIGS. 3A through 6B are in Table I, whereas, equations defining or utilizing the variables and parameters of Table I are incorporated within the appropriate functional blocks of FIGS. 3A through 6B.

TABLE I

| Variable | Description |
| --- | --- |
| BF | Brake Flag (value can be either T = True or F = False) |
| BP | Brake Booster Pressure |
| BPROC | Brake Booster Pressure Rate of Change |
| LTIME | Loop Time (elapsed time between Brake Booster Vacuum predictions) |
| VDEC | Vehicle Deceleration |
| PATM | Barometric Pressure |
| BBV | Brake Booster Vacuum |
| DBP | Change in Brake Booster Pressure |
| DAT | Deceleration Apply Threshold |
| DRT | Deceleration Release Threshold |
| BIP | Brake Booster Inlet Pressure |
| MAP | Manifold Absolute Pressure |
| CVPL | Check Valve Pressure Loss |
| PVDEC | Previous Vehicle Deceleration |
| TAU | Brake Booster Vacuum Replenishment Time Constant |
| CF | Correction Factor |
| REFBP | Reference Brake Booster Pressure |
| XD | Brake Booster Diaphragm Displacement and Brake Master Cylinder Displacement |

Figure 3A:
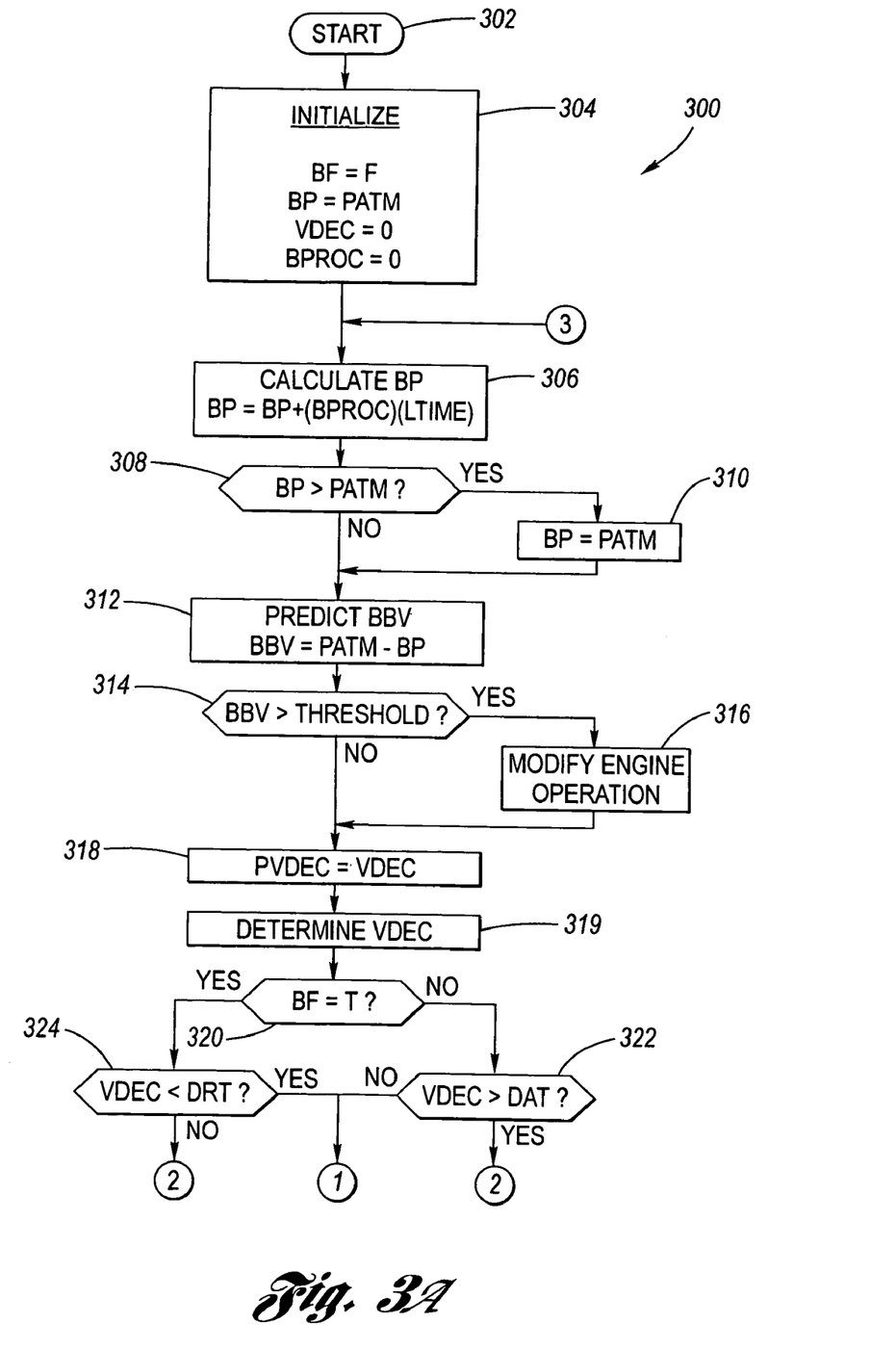
FIGS. 3A and 3B depict a detailed flow chart according to a first preferred embodiment of the brake booster vacuum prediction algorithm according to the present invention.
Figure 3B:
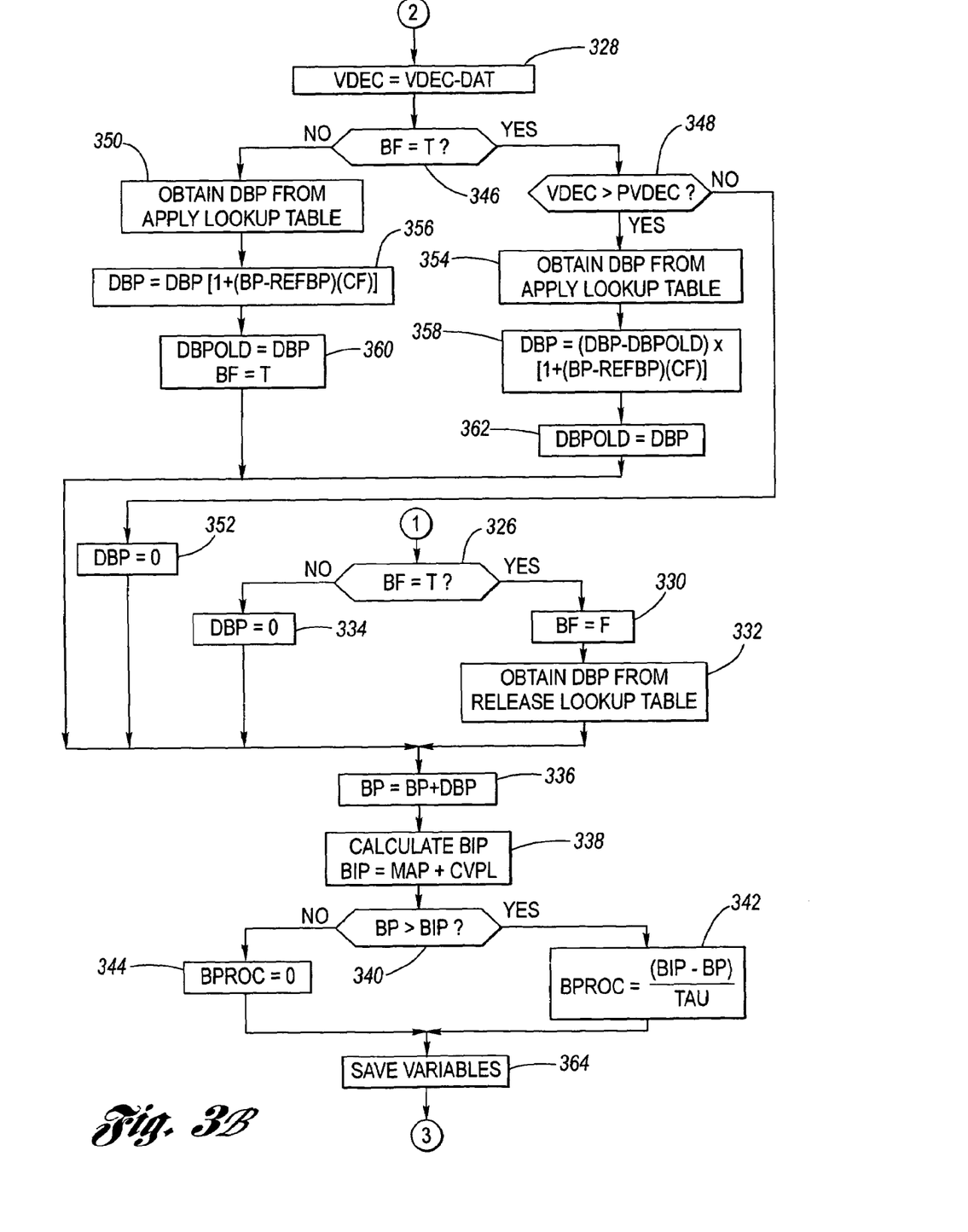

FIGS. 3A and 3B depict a detailed flow chart algorithm 300 of the brake booster vacuum prediction algorithm according to a first preferred embodiment of the present invention. The algorithm 300 starts at Block 302 through the main engine controller or ECM, then control passes to Block 304 where initialization of variables and parameters occurs. Brake booster pressure is then calculated at Block 306. If brake booster pressure is greater than atmospheric pressure at Block 308, brake booster pressure is set equal to atmospheric pressure at Block 310 and control passes to Block 312. Otherwise, if brake booster pressure is not greater than atmospheric pressure at Block 308, control passes to Block 312. Brake booster vacuum is predicted at Block 312 by subtracting the brake booster pressure from atmospheric pressure and then compared at Block 314 to a predetermined calibrated brake booster vacuum threshold, available from the ECM. If brake booster vacuum is greater than the brake booster vacuum threshold, (that is the absolute pressure of the brake booster vacuum is higher than the absolute pressure of the brake booster vacuum threshold), denoting inadequate brake booster vacuum to meet vehicle braking requirements, then engine operation is modified at block 316 by the ECM to provide adequate intake manifold vacuum to meet brake booster vacuum requirements for vehicle braking. After which control passes to Block 318. Otherwise, control directly passes to Block 318 without modifying engine operation. The main program of the ECM executes Block 316 and, preferably, Block 314.

At Block 318, vehicle deceleration is assigned to the variable PVDEC to be utilized as a previous deceleration, after which control passes to Block 319. At Block 319, vehicle deceleration is calculated from vehicle speed, available from the ECM, by linear regression or similar procedures well know in the art. Control then passes to Block 320. If the brake flag is true at Block 320, then control passes to Block 322. Otherwise, control passes to Block 324.

At Block 322, if vehicle deceleration is greater than a Deceleration Apply Threshold, or at Block 324, if vehicle deceleration is not less than a Deceleration Release Threshold, then control passes to Block 328. At Block 322, if vehicle deceleration is less than a Deceleration Apply Threshold, or at Block 324, if vehicle deceleration is less than a Deceleration Release Threshold, then control passes to Block 326. The Deceleration Apply Threshold and Deceleration Release Threshold are predetermined parameters for a specific vehicle, stored in a lookup table, whose values are obtained either through previous calculations or empirically determined for a specific vehicle and compensated for parasitic losses, such as, for example, aerodynamic drag, rolling resistance, and powertrain drag.

For the case of control passing to Block 326, if the brake flag is true at Block 326, then a release brake event is determined as occurring and control passes to Block 330. The brake flag is set false at Block 330 and control passes to Block 332. At Block 326, if the brake flag is false, then a no brake event is determined as occurring and control passes to Block 334. The change in brake booster pressure is equated to zero at Block 334 and control passes to Block 336. At Block 332, the change in brake booster pressure as a function of vehicle deceleration when a release brake event is determined as occurring is obtained from a Release Lookup Table, stored in memory, wherein values in the Release Lookup Table relating the change in brake booster pressure as a function of vehicle deceleration have been empirically determined for the brake system for a specific vehicle. Control then passes from Block 332 to Block 336.

Brake booster pressure is calculated at Block 336 and brake booster inlet pressure is calculated at Block 338 wherein the MAP is available from the ECM and the CVPL is a predetermined quantity, stored in memory, for each specific check valve. If brake booster pressure is greater than brake booster inlet pressure at Block 340, then control passes to Block 342, whereat the rate of change of brake booster pressure is calculated. The brake booster vacuum replenishment time constant TAU utilized in Block 342 is empirically determined for a specific vehicle. For example, TAU is empirically determined to have a value from 0.25 seconds to 0.75 seconds depending upon the brake system for a specific vehicle. Control then passes from Block 342 to Block 364, whereat variables are saved in, preferably, ECM memory after which control passes back to Block 306 enabling the process to repeat. If brake booster pressure is less than brake booster inlet pressure at Block 340, then the rate of change of brake booster pressure is equated to zero at Block 344 and control then passes to Block 364, whereat variables are saved in, preferably, ECM memory after which control passes to Block 306 enabling the process to repeat.

For the case of control passing to Block 328, vehicle deceleration is calculated at Block 328, to be utilized as a present vehicle deceleration incorporating compensation for parasitic losses, such as, for example, aerodynamic drag, rolling resistance, and powertrain drag, as previously mentioned. Control is then passed to Block 346. If the brake flag is true at Block 346, control passes to Block 348. Otherwise, an apply brake event is determined as occurring and control passes to Block 350. At Block 348, if vehicle deceleration is not greater than the previous vehicle deceleration, then a no brake event is determined as occurring and control passes to Block 352. At Block 352, the change in brake booster pressure is equated to zero, after which control passes to Block 336 and algorithmic execution continues as previously described. At Block 348, if vehicle deceleration is greater than the previous vehicle deceleration, then an apply brake event is determined as occurring and control passes to Block 354.

At Blocks 350 and 354, the change in brake booster pressure as a function of vehicle deceleration, when an apply brake event is determined as occurring, is obtained from an Apply Lookup Table, stored in memory, wherein values in the Apply Lookup Table relating the change in brake booster pressure as a function of vehicle deceleration have been empirically determined for the brake system for a specific vehicle. Blocks 350 and 354 utilize the same Apply Lookup Table. Control passes from Block 350 to Block 356, whereas control passes from Block 354 to Block 358.

At Block 356, the present change in brake booster pressure is calculated utilizing, as one parameter, the change in brake booster pressure obtained in Block 350. The reference brake booster pressure and correction factor in Block 356 are empirically determined for the brake system of a specific vehicle and are stored in memory. Control passes from Block 356 to Block 360, whereat the change in brake booster pressure is stored in memory as the variable BPOLD and the brake flag is set to true, after which control passes to Block 336 and algorithmic execution continues as previously described.

At Block 358, the present change in brake booster pressure is calculated utilizing, as one parameter, the change in brake booster pressure obtained in Block 354. The reference brake booster pressure and correction factor in Block 358 are empirically determined for the brake system of a specific vehicle and are stored in memory. Control passes from Block 358 to Block 362, whereat the change in brake booster pressure is stored in memory as the variable BPOLD, after which control passes to Block 336 and algorithmic execution continues as previously described.

Figure 4A:
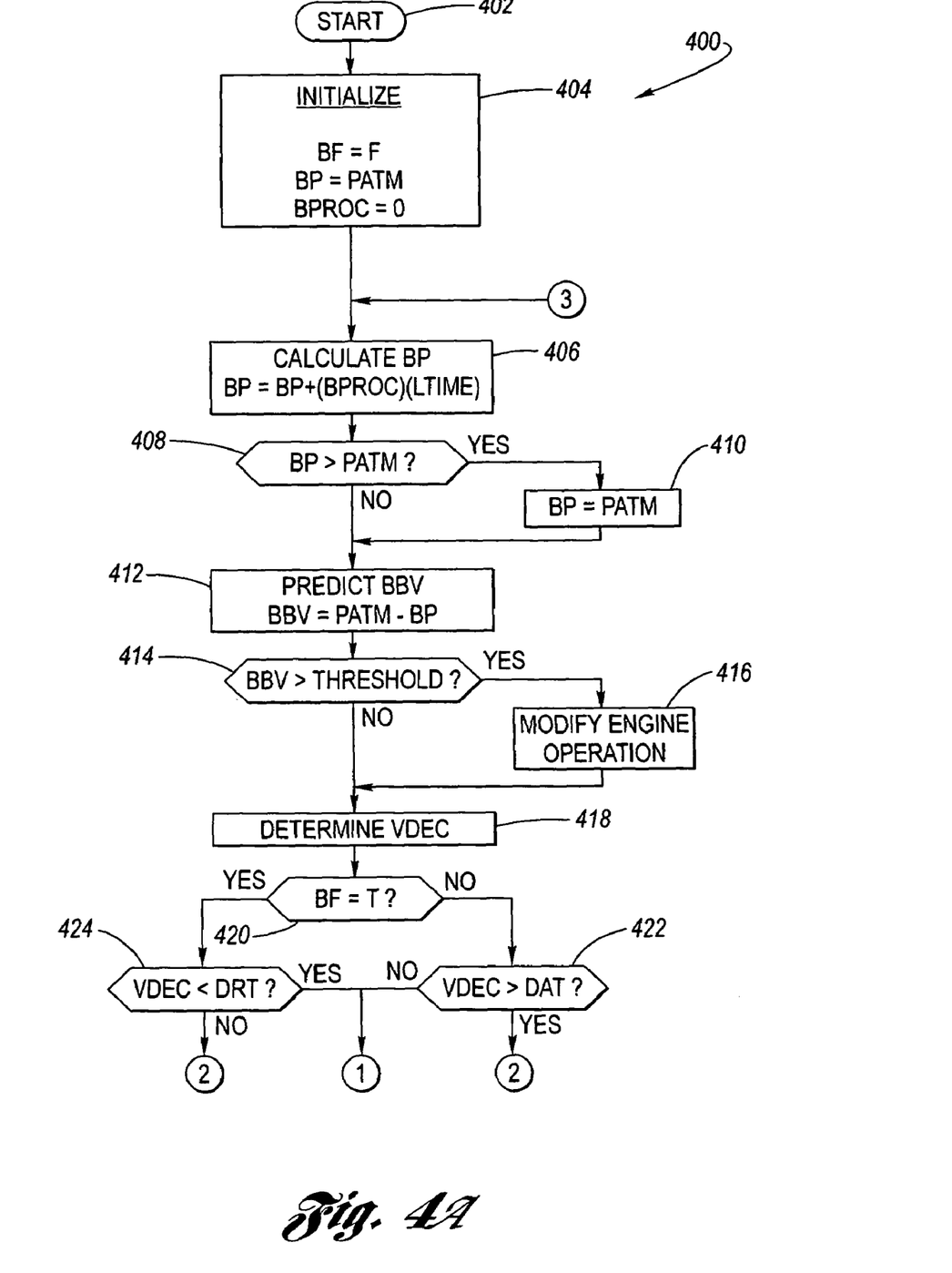
FIGS. 4A and 4B depict a detailed flow chart of the brake booster vacuum prediction algorithm according to a second preferred embodiment of the present invention.
Figure 4B:
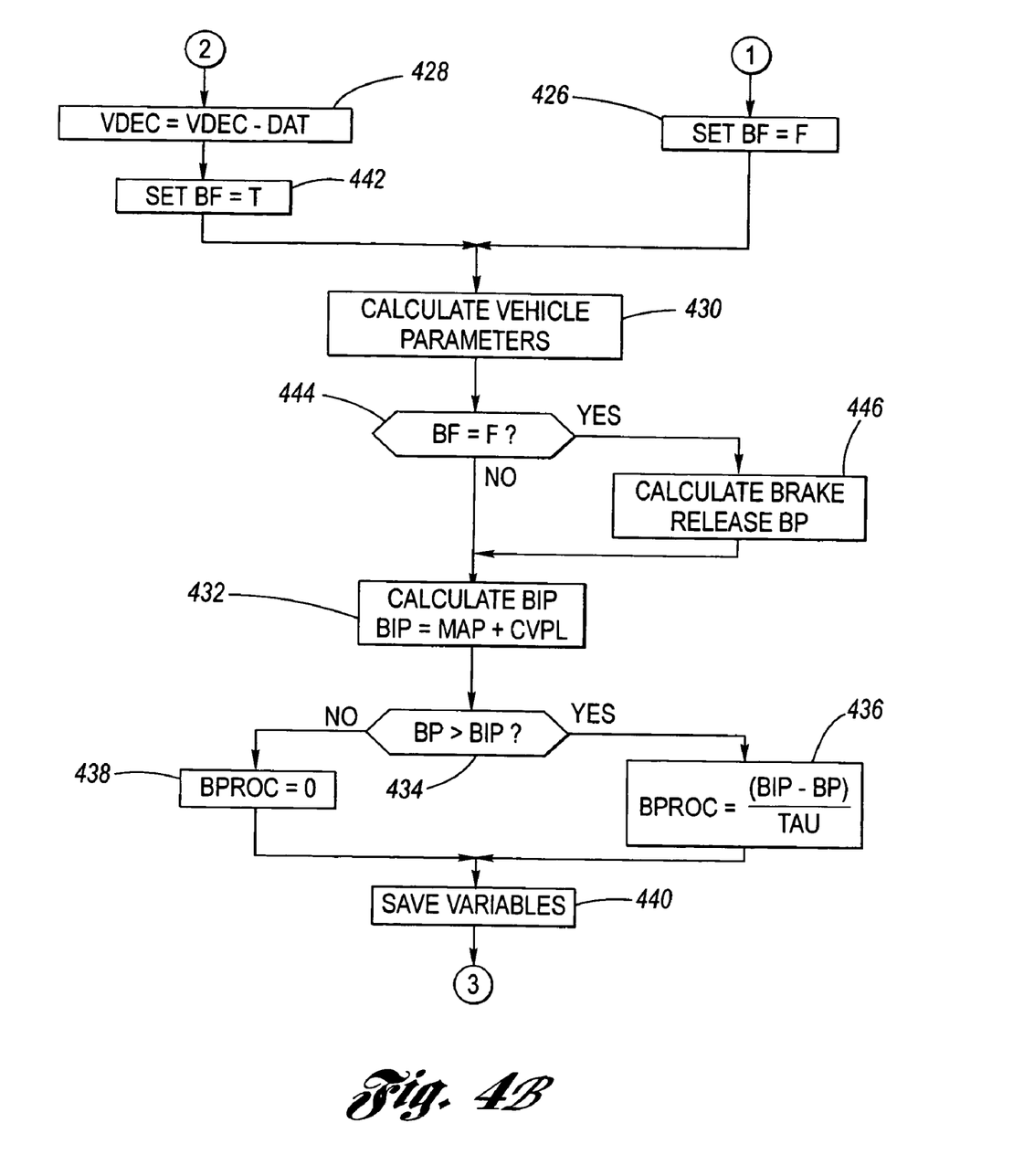

FIGS. 4A and 4B depict a detailed flow chart algorithm 400 of the brake booster vacuum prediction algorithm according to a second preferred embodiment of the present invention. Variables and parameters utilized in FIGS. 4A and 4B are described in Table 1, wherein equations defining or utilizing the variables and parameters are incorporated within the appropriate functional blocks of FIGS. 4A and 4B and will be described hereinbelow in more detail as necessary.

The algorithm 400 starts at Block 402 through the main engine controller or ECM, then control passes to Block 404 where initialization of variables and parameters occurs. Brake booster pressure is then calculated at Block 406. If brake booster pressure is greater than atmospheric pressure at Block 408, brake booster pressure is set equal to atmospheric pressure at Block 410 and control passes to Block 412. Otherwise, if brake booster pressure is not greater than atmospheric pressure at Block 408, control passes to Block 412. Brake booster vacuum is predicted at Block 412 by subtracting the brake booster pressure from atmospheric pressure and then compared at Block 414 to a predetermined calibrated brake booster vacuum threshold, available from the ECM. If brake booster vacuum is greater than the brake booster vacuum threshold, (that is, the absolute pressure of the brake booster vacuum is higher than the absolute pressure of the brake booster vacuum threshold), denoting inadequate brake booster vacuum to meet vehicle braking requirements, then engine operation is modified at block 416 by the ECM to provide adequate intake manifold vacuum to meet brake booster vacuum requirements for vehicle braking. After which control passes to Block 418. Otherwise, control passes directly to Block 418 without modifying engine operation. The main program of the ECM executes Block 416 and, preferably, Block 414. At Block 418, vehicle deceleration is calculated from vehicle speed, available from the ECM, by linear regression or similar procedures well know in the art. Control then passes to Block 420. If the brake flag is true at Block 420, then control passes to Block 422. Otherwise, control passes to Block 424.

At Block 422, if vehicle deceleration is greater than a Deceleration Apply Threshold, or at Block 424, if vehicle deceleration is not less than a Deceleration Release Threshold, then control passes to Block 428. At Block 422, if vehicle deceleration is not greater than a Deceleration Apply Threshold, or at Block 424, if vehicle deceleration is less than a Deceleration Release Threshold, then control passes to Block 426. The Deceleration Apply Threshold and Deceleration Release Threshold are predetermined parameters for a specific vehicle, stored in a lookup table, whose values are obtained either through previous calculations or empirically determined for a specific vehicle and compensate for parasitic losses, such as, for example, aerodynamic drag, rolling resistance, and powertrain drag.

For the case of control passing to Block 426, the brake flag is set false at Block 426 and control passes to Block 430.

For the case of control passing to Block 428, vehicle deceleration is calculated at Block 428, to be utilized as a present vehicle deceleration incorporating compensation for parasitic losses, such as, for example, aerodynamic drag, rolling resistance, and powertrain drag as previously mentioned. Control is then passed to Block 442, whereat the brake flag is set true and control then passes to Block 430.

At Block 430, vehicle parameters are calculated, to be described later, and control then passes to Block 444. If the brake flag is true at Block 444, control passes to Block 432. Otherwise, a release brake event or a no brake event is determined as occurring and control passes to Block 446, whereat the brake booster pressure is calculated on brake release, to be described later, and control then passes to Block 432.

Brake booster inlet pressure is calculated at Block 432, wherein the MAP is available from the ECM and the CVPL is a predetermined quantity, stored in memory, for each specific check valve. If brake booster pressure is greater than brake booster inlet pressure at Block 434, then control passes to Block 436, whereat the rate of change of brake booster pressure is calculated. The brake booster vacuum replenishment time constant TAU utilized in Block 436 is empirically determined for a specific vehicle. For example, TAU is empirically determined to have a value from 0.25 seconds to 0.75 seconds depending upon the brake system for a specific vehicle. Control then passes from Block 436 to Block 440 whereat variables are saved in, preferably, ECM memory. Control then passes to Block 406 enabling the process to repeat. If brake booster pressure is less than brake booster inlet pressure at Block 434, then the rate of change of brake booster pressure is equated to zero at Block 438, and control then passes to Block 440, whereat variables are saved in, preferably, ECM memory after which control passes to Block 406 enabling the process to repeat.

Figure 5A:
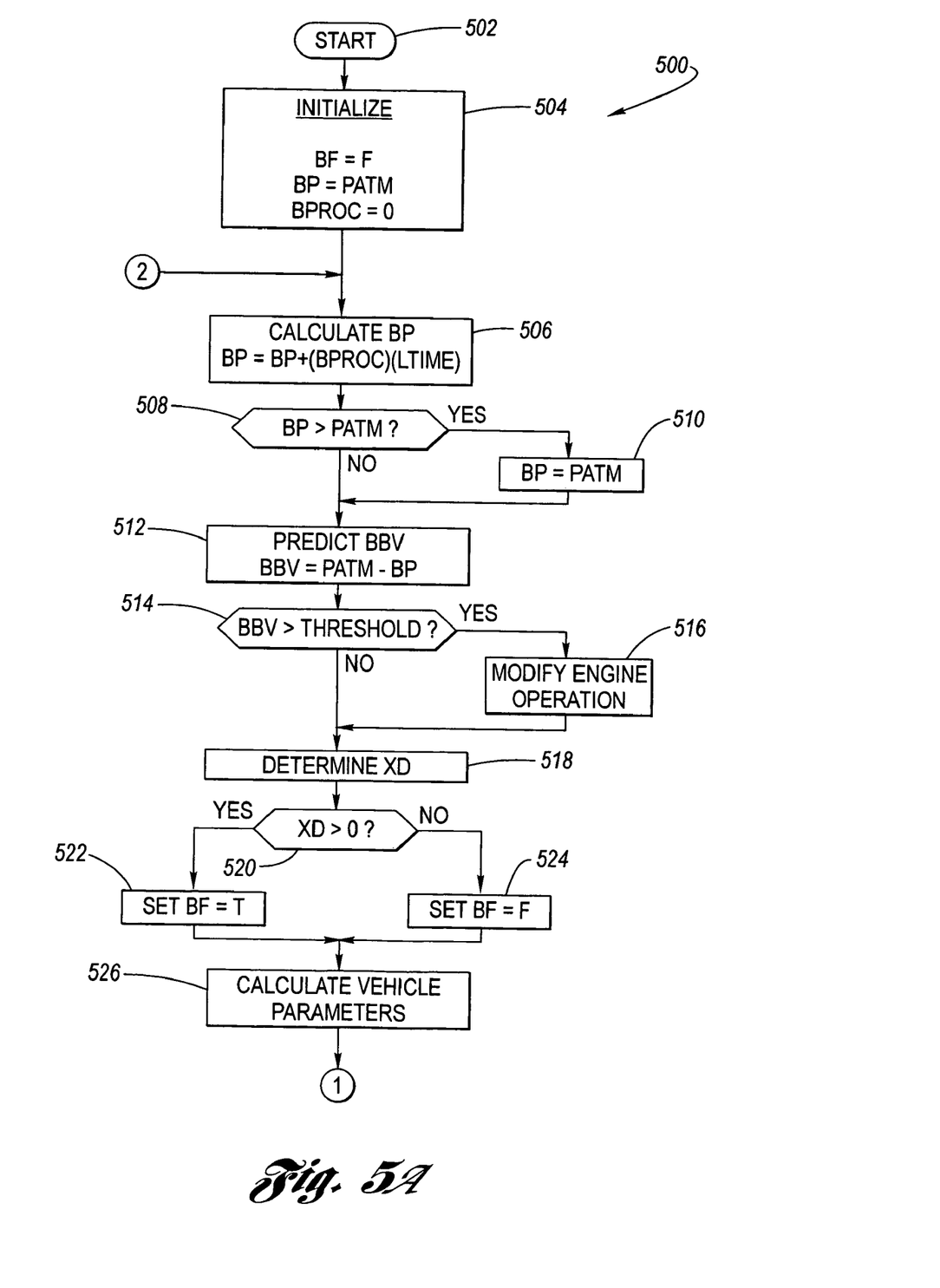
FIGS. 5A and 5B depict a detailed flow chart of the brake booster vacuum prediction algorithm according to a third preferred embodiment of the present invention.
Figure 5B:
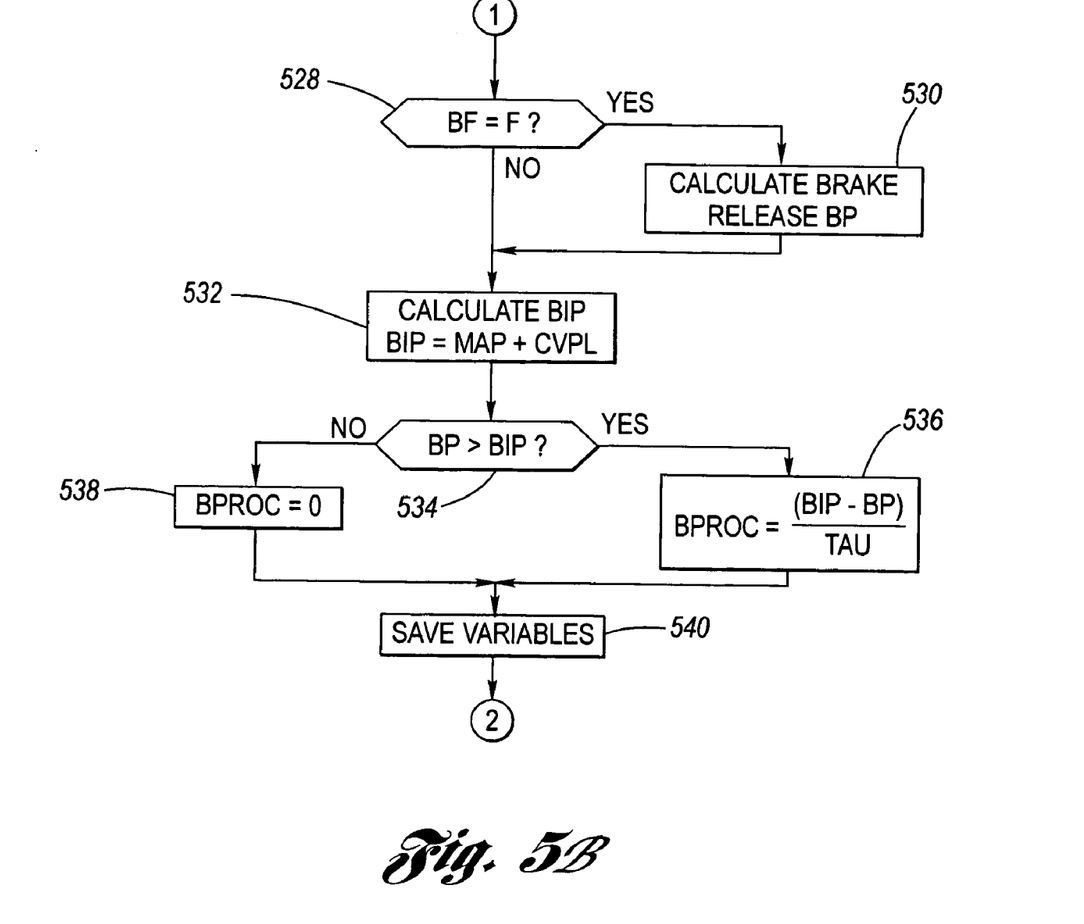

FIGS. 5A and 5B depict a detailed flow chart algorithm 500 of the brake booster vacuum prediction algorithm according to a third preferred embodiment of the present invention. Variables and parameters utilized in FIGS. 5A and 5B are described in Table 1, wherein equations defining or utilizing the variables and parameters are incorporated within the appropriate functional Blocks of FIGS. 5A and 5B and will be described herein below in more detail as necessary.

The algorithm 500 starts at Block 502 through the main engine controller or ECM, then control passes to Block 504 where initialization of variables and parameters occurs. Brake booster pressure is then calculated at Block 506. If brake booster pressure is greater than atmospheric pressure at Block 508, brake booster pressure is set equal to atmospheric pressure at Block 510 and control then passes to Block 512. Otherwise, if brake booster pressure is not greater than atmospheric pressure at Block 508, control passes to Block 512. Brake booster vacuum is predicted at Block 512 by subtracting the brake booster pressure from atmospheric pressure and then compared at Block 514 to a predetermined calibrated brake booster vacuum threshold, available from the ECM. If brake booster vacuum is greater than the brake booster vacuum threshold, (that is the absolute pressure of the brake booster vacuum is higher than the absolute pressure of the brake booster vacuum threshold), denoting inadequate brake booster vacuum to meet vehicle braking requirements, then engine operation is modified at block 516 by the ECM to provide adequate intake manifold vacuum to meet brake booster vacuum requirements for vehicle braking. After which control passes to Block 518. Otherwise, control passes directly to Block 518 without modifying engine operation.

The main program of the ECM executes Block 516 and, preferably, Block 514. At Block 518, brake booster diaphragm displacement or brake master cylinder displacement XD is determined from brake pedal position, as previously described, wherein master cylinder displacement is equal to brake booster diaphragm displacement. The brake booster diaphragm position as a function of the brake pedal position is, preferably, empirically determined and stored in memory. Control then passes to Block 520. If the brake booster diaphragm position is greater than zero at Block 520, then an applied brake event is determined as occurring and control passes to Block 522. Otherwise, a no brake event is determined as occurring and control passes to Block 524.

The brake flag is set true at Block 522 and control passes to Block 526. Otherwise, the brake flag is set false at Block 524 and control passes to Block 526. At Block 526, vehicle parameters are calculated, to be described later, and control then passes to Block 528. If the brake flag is true at Block 528, then control passes to Block 532. Otherwise, a no brake event is determined as occurring and control passes to Block 530, whereat the brake booster pressure is calculated on brake release, to be described later, and control then passes to Block 532.

Brake booster inlet pressure is calculated at Block 532, wherein the MAP is available from the ECM and the CVPL is a predetermined quantity, stored in memory, for each specific check valve. If brake booster pressure is greater than brake booster inlet pressure at Block 534, then control passes to Block 536, whereat the rate of change of brake booster pressure is calculated. The brake booster vacuum replenishment time constant TAU utilized in Block 536 is empirically determined for a specific vehicle. For example, TAU is empirically determined to have a value from 0.25 seconds to 0.75 seconds depending upon the brake system for a specific vehicle. Control then passes from Block 536 to Block 540, whereat variables are saved in, preferably, ECM memory after which control passes to Block 506 enabling the process to repeat. If brake booster pressure is less than brake booster inlet pressure at Block 534, then the rate of change of brake booster pressure is equated to zero at Block 538 and control then passes to Block 540, whereat variables are saved in, preferably, ECM memory after which control passes to Block 506 enabling the process to repeat.

In addition to the variables and parameters described in Table 1, Blocks 430 and 446 of FIG. 4B and Blocks 526 and 530 of FIGS. 5A and 5B utilize parameters presented in Table II. All known or empirically determined values of variables or functions are stored in ECM memory and are available for calculations. Known variables are those whose values can be determined, for example, by measurement, for example, the mass of the vehicle, area of the brake master cylinder, and booster diaphragm area.

TABLE II

| Variable | Description | Determination |
|---|---|---|
| FDEC | Vehicle decelerating force | Calculated |
| M | Mass of vehicle | Known |
| BT | Total brake system torque | Calculated |
| RR | Rolling radius of wheel | Known |
| PL | Brake line pressure | Calculated |
| STT | Total specific torque | Empirically Determined |
| FO | Brake booster output force to brake master cylinder | Calculated |
| FI | Brake booster input force | Calculated |
| FB | Brake booster force | Calculated |
| GB | Brake booster gain | Empirically Determined |
| PA | Brake booster apply side pressure | Calculated |
| AD | Brake booster diaphragm area | Known |
| DF | Brake fluid displacement for a wheel | Calculated |
| VF | Total volume of brake fluid displaced (Sum of DF for all wheels) | Calculated |
| AMC | Brake master cylinder area | Known |
| VB | Total brake booster volume | Calculated |
| SB | Brake booster stroke | Known |
| VV | Brake booster vacuum side volume | Calculated |
| VA | Brake booster apply side volume | Calculated |
| MV | Mass of air in brake booster vacuum side volume | Calculated |
| MA | Mass of air in brake booster apply side volume | Calculated |
| R | Universal Gas Constant for air | Known |
| T | Temperature of air in Kelvin | Known |
| b, c and K | Brake constants specific to a wheel of the vehicle | Empirically Determined |

The following equations are utilized in Block 430 of FIG. 4B and Block 526 of FIG. 5A to calculate vehicle parameters:

$$FDEC = M * VDEC \quad (1)$$

$$BT = FDEC/RR \quad (2)$$

$$PL = BT/SST \quad (3)$$

$$FO = PL * AMC \quad (4)$$

$$FB = GB * FO/(1+GB) \quad (5)$$

$$PA = BP + FB/AD \quad (6)$$

$$X = c * PL \text{ (variable used in equation 10)} \quad (7)$$

$$DF = (1 + e^{-X}) * (K * PL + b) \quad (8)$$

$$XD = VF/AMC \quad (9)$$

$$VB = AD * SB \quad (10)$$

$$VV = VB - XD * AD \quad (11)$$

$$VA = XD * AD \quad (12)$$

$$MV = BP * VV/(R * T) \quad (13)$$

$$MA = PA * VA/(R * T) \quad (14)$$

The following equations are utilized in Block 446 of FIG. 4B and Block 530 of FIG. 5B to calculate the brake booster pressure on brake release:

$$VA = 0 \quad (15)$$

$$VV = VB \quad (16)$$

$$MV = MV + MA \quad (17)$$

$$BP = MV * R * T/VV \quad (18)$$

MV and MA on the right hand side of equation (17) are defined by equations (13) and (14).

Figure 6A:
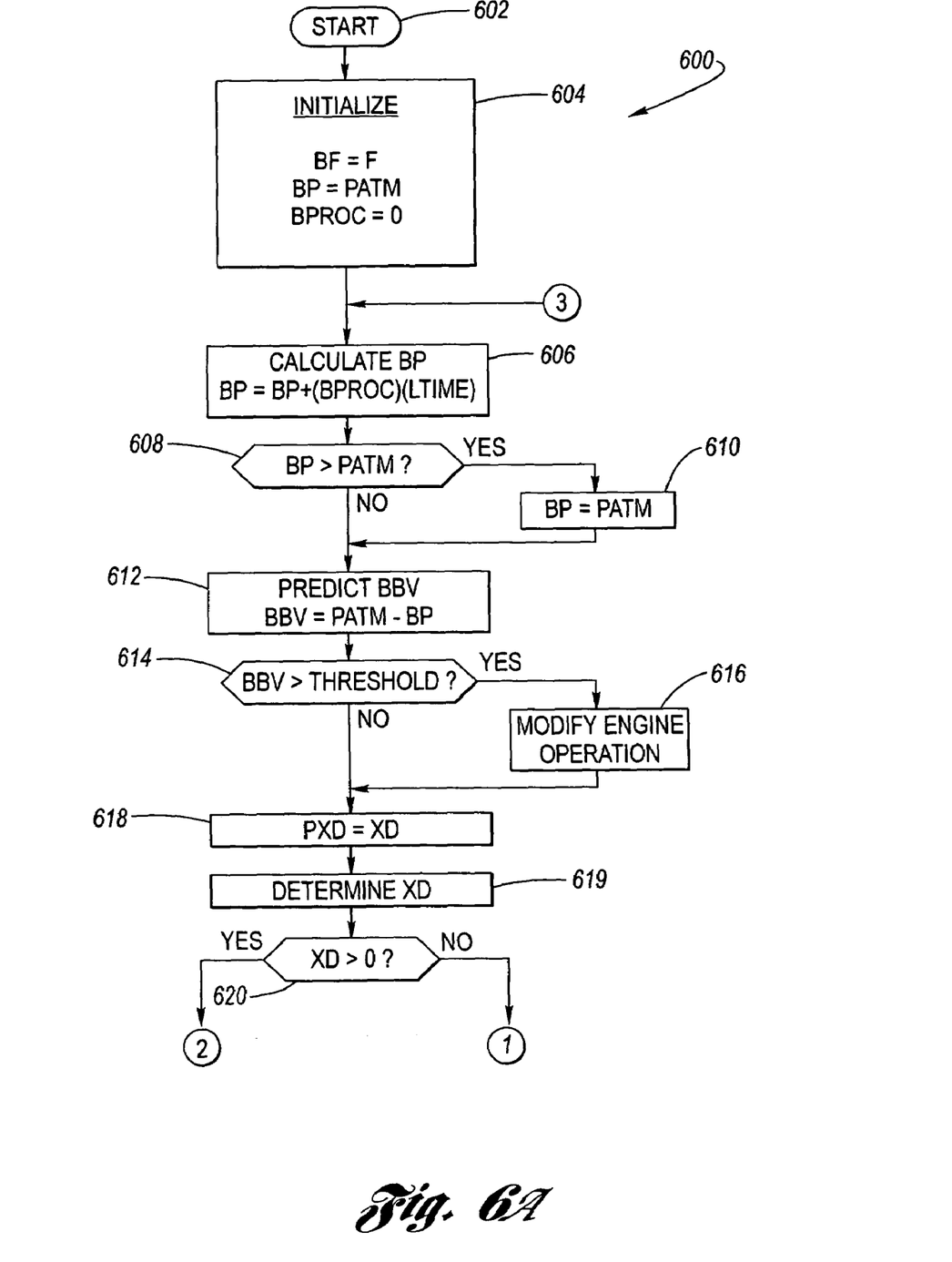
FIGS. 6A and 6B depict a detailed flow chart according to a fourth preferred embodiment of the brake booster vacuum prediction algorithm according to the present invention.
Figure 6B:
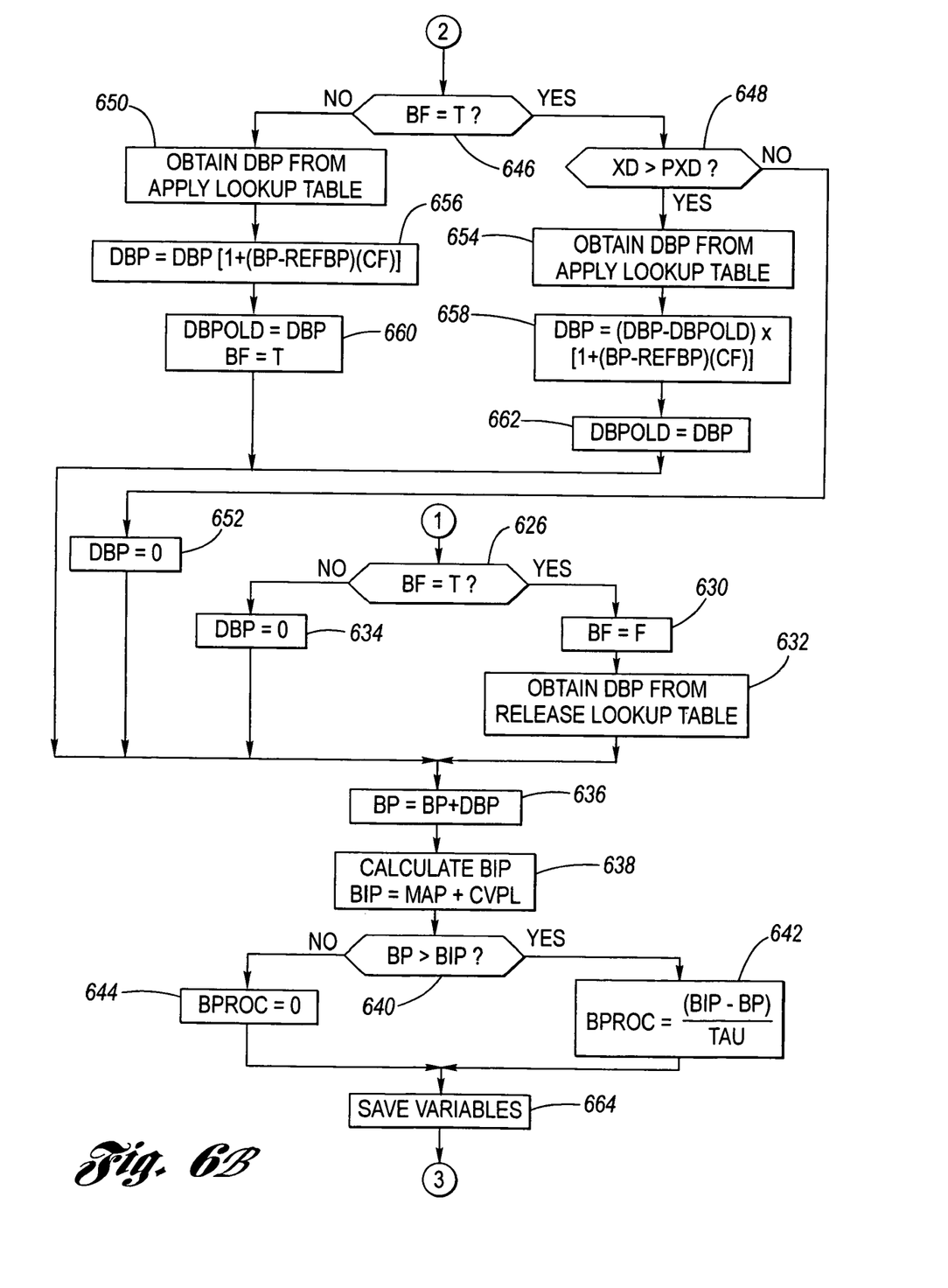

FIGS. 6A and 6B depict a detailed flow chart algorithm 600 of the brake booster vacuum prediction algorithm according to a fourth preferred embodiment of the present invention. The algorithm 600 starts at Block 602 through the main engine controller or ECM then control passes to Block 604 where initialization of variables and parameters occurs. Brake booster pressure is then calculated at Block 606. If brake booster pressure is greater than atmospheric pressure at Block 608, brake booster pressure is set equal to atmospheric pressure at Block 610 and control passes to Block 612. Otherwise, if brake booster pressure is not greater than atmospheric pressure at Block 608, control passes to Block 612. Brake booster vacuum is predicted at Block 612 by subtracting the brake booster pressure from atmospheric pressure and then compared at Block 614 to a predetermined calibrated brake booster vacuum threshold, available from the ECM. If brake booster vacuum is greater than the brake booster vacuum threshold, (that is the absolute pressure of the brake booster vacuum is higher than the absolute pressure of the brake booster vacuum threshold), denoting inadequate brake booster vacuum to meet vehicle braking requirements, then engine operation is modified at block 616 by the ECM to provide adequate intake manifold vacuum to meet brake booster vacuum requirements for vehicle braking. After which control passes to Block 618. Otherwise, control directly passes to Block 618 without modifying engine operation. The main program of the ECM executes Block 616 and, preferably, Block 614.

At Block 618 brake booster diaphragm displacement or brake master cylinder displacement XD is assigned to the variable PXD to be utilized as a previous brake booster diaphragm displacement or brake master cylinder displacement after which control passes to Block 619. At Block 619, brake booster diaphragm displacement or brake master cylinder displacement XD is determined from brake pedal position, as previously described, wherein master cylinder displacement is equal to brake booster diaphragm displacement. The brake booster diaphragm position as a function of the brake pedal position is, preferably, empirically determined and stored in memory. Control then passes to Block 620. If XD is greater than zero at Block 620, control passes to Block 646. Otherwise, control passes to Block 626.

If the brake flag is true at Block 626, then a release brake event is determined as occurring, the brake flag is set false at Block 630 and control passes to Block 632. If the brake flag is false at Block 626, then a no brake event is determined as occurring, the change in brake booster pressure is equated to zero at Block 634 and control passes to Block 636. At Block 632, the change in brake booster pressure as a function of XD when a release brake event is occurring is obtained from a Release Lookup Table, stored in memory, wherein values in the Release Lookup Table relating the change in brake booster pressure as a function of XD have been empirically determined for the brake system for a specific vehicle. Control then passes from Block 632 to Block 636.

Brake booster pressure is calculated at Block 636 and brake booster inlet pressure is calculated at Block 638 wherein the MAP is available from the ECM and the CVPL is a predetermined quantity, stored in memory, for each specific check valve. If brake booster pressure is greater than brake booster inlet pressure at Block 640, then control passes to Block 642, whereat the rate of change of brake booster pressure is calculated. The brake booster vacuum replenishment time constant TAU utilized in Block 642 is empirically determined for a specific vehicle. For example, TAU is empirically determined to have a value from 0.25 seconds to 0.75 seconds depending upon the brake system for a specific vehicle. Control then passes from Block 642 to Block 664 whereat variables are saved in, preferably, ECM memory after which control passes to Block 606 enabling the process to repeat. If brake booster pressure is less than brake booster inlet pressure at Block 640, then the rate of change of brake booster pressure is equated to zero at Block 644 and control then passes to Block 664, whereat variables are saved in, preferably, ECM memory after which control passes to Block 606 enabling the process to repeat.

For the case of control passing to Block 646, if the brake flag is true at Block 646 control passes to Block 648. Otherwise, an apply brake event is determined as occurring and control passes to Block 650. At Block 648, if XD is less than the previous XD (i.e. PXD), a no brake event is determined as occurring and control passes to Block 652 whereat the change in brake booster pressure is equated to zero, after which control passes to Block 636 and algorithmic execution continues as previously described. At Block 648, if XD is greater than the previous XD (i.e. PXD), an apply brake event is determined as occurring and control passes to Block 654.

At Blocks 650 and 654, the change in brake booster pressure as a function of XD, when an apply brake event is determined as occurring, is obtained from an Apply Lookup Table, stored in memory, wherein values in the Apply Lookup Table relating the change in brake booster pressure as a function of XD have been empirically determined for the brake system for a specific vehicle. Blocks 650 and 654 utilize the same Apply Lookup Table. Control passes from Block 650 to Block 656, whereas control passes from Block 654 to Block 658.

At Block 656, the present change in brake booster pressure is calculated utilizing, as one parameter, the change in brake booster pressure obtained in Block 650. The reference brake booster pressure and correction factor in Block 656 are empirically determined for the brake system of a specific vehicle and are stored in memory. Control passes from Block 656 to Block 660, whereat the change in brake booster pressure is stored in memory as the variable BPOLD and the brake flag is set to true, after which control passes to Block 636 and algorithmic execution continues as previously described.

At Block 658, the present change in brake booster pressure is calculated utilizing, as one parameter, the change in brake booster pressure obtained in Block 654. The reference brake booster pressure and correction factor in Block 658 are empirically determined for the brake system of a specific vehicle and are stored in memory. Control passes from Block 658 to Block 662, whereat the change in brake booster pressure is stored in memory as the variable BPOLD, after which control passes to Block 636 and algorithmic execution continues as previously described.

Figure 7:
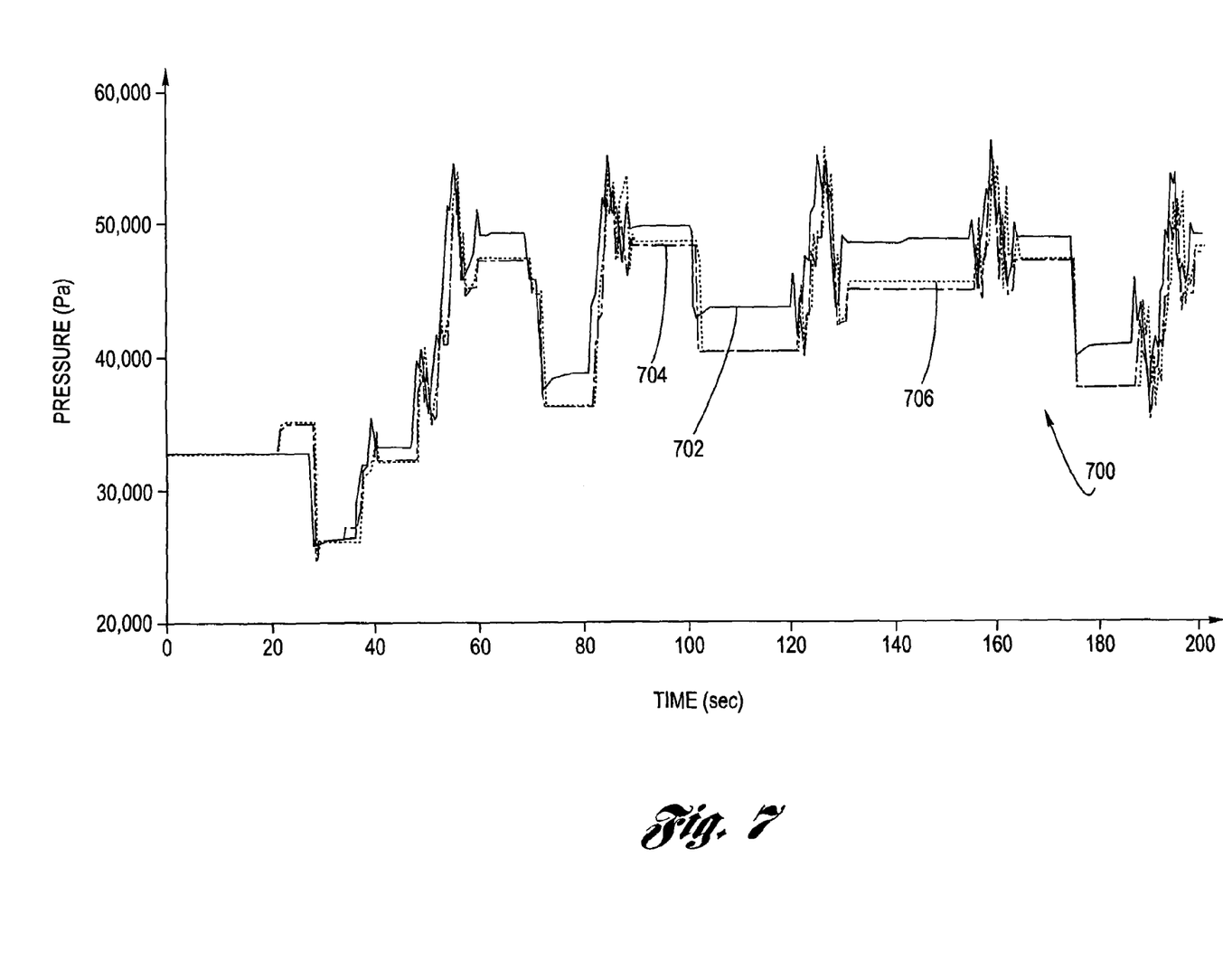
FIG. 7 is a plot series of brake booster vacuum versus time for stop-and-go driving of a motor vehicle, including a measured brake booster vacuum, a first predicted brake booster vacuum using the method of FIGS. 3A and 3B, and, a second predicted brake booster vacuum using the method of FIGS. 4A and 4B.

FIG. 7 depicts a series of plots 700 which illustrate the foregoing exposition. A motor vehicle under stop-and-go conditions was used, wherein brake booster vacuum, indicated by absolute pressure, is plotted as a function of driving time. Plot 702 indicates actual measured brake booster vacuum. Plot 704 indicates predicted brake booster vacuum determined by the method of FIGS. 3A and 3B. Finally, Plot 706 indicates predicted brake booster vacuum determined by the method of FIGS. 4A and 4B. As can be readily seen, both prediction modalities (FIGS. 3A, 3B and FIGS. 4A, 4B) provide brake booster vacuum values which correlate well to the measured values.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for adjusting brake booster vacuum of an engine of a motor vehicle at a brake booster thereof, said method comprising the steps of:

initially setting a brake booster pressure of the brake booster equal to a predetermined pressure;

predicting brake booster vacuum;

determining whether the predicted brake booster vacuum is above a threshold vacuum;

modifying operation of the engine to lower a brake booster vacuum of the engine if said step of determining determines the predicted brake booster vacuum is above the threshold vacuum; and periodically repeating said steps of predicting, determining and modifying;

wherein said step of predicting comprises:

acquiring predetermined input variables of the motor vehicle, the variables comprising manifold absolute pressure, atmospheric pressure, end brake pedal position;

determining from the brake pedal position whether an apply brake event of the motor vehicle is occurring;

determining from the brake pedal position whether a release brake event of the motor vehicle is occurring;

determining from the brake pedal position whether a no brake event of the motor vehicle is occurring;

obtaining a change in brake booster pressure as a function of brake pedal position from an apply brake look-up table if the apply brake event is determined as occurring;

obtaining a change in brake booster pressure as a function of brake pedal position from a release brake look-up table if the release brake event is determined as occurring;

obtaining a change in brake booster pressure set equal to zero if the no brake event of the motor vehicle is determined as occurring; and calculating brake booster vacuum responsive to the obtained change in brake booster pressure.

2. The method of claim 1, wherein said step of acquiring further comprises acquiring check valve pressure loss of the brake booster; and wherein said step of calculating comprises:

determining a present brake booster pressure responsive to the obtained change in brake booster pressure and a predetermined prior brake booster pressure;

determining a brake inlet booster pressure of the brake booster responsive to the manifold absolute pressure and a predetermined check valve pressure loss;

determining whether the present brake booster pressure is greater than the brake inlet booster pressure;

setting a brake booster pressure rate of change equal to zero if the present brake booster pressure is less than the brake inlet booster pressure;

determining a brake booster pressure rate of change responsive to a difference between the brake inlet booster pressure and the present brake booster pressure per a predetermined brake booster vacuum replenishment time constant if the present brake booster pressure is greater than the brake inlet booster pressure;

calculating a new brake booster pressure as a function of the present brake booster pressure and the brake booster pressure rate of change for a predetermined time, wherein the predetermined time is related to the periodic repeating;

setting the new brake booster pressure equal to atmospheric pressure if the new brake booster pressure is greater than atmospheric pressure; and predicting the brake booster vacuum as a function of a difference between atmospheric pressure and the new brake booster pressure.

* * * * *